US005935366A

United States Patent [19]

Wood

[11] Patent Number: 5,935,366

[45] Date of Patent: Aug. 10, 1999

[54] PROCESS FOR ENVIRONMENTALLY SAFE CLEANING USING WATER-SOLUBLE POLYMER BASED PACKAGES

[75] Inventor: James P. Wood, Carmel, Ind.

[73] Assignee: Eli Lilly and Company, Indianapolis, Ind.

[21] Appl. No.: 08/694,145

[22] Filed: Aug. 8, 1996

Related U.S. Application Data

[60] Provisional application No. 60/003,348, Sep. 7, 1995.

[51] Int. Cl.[6] .............................. B32B 25/00; B08B 9/02

[52] U.S. Cl. ...................... 156/251; 156/155; 156/275.1; 156/281; 156/308.4; 134/5; 134/22.11; 134/24; 134/42

[58] Field of Search .................................... 156/155, 251, 156/250, 275.1, 281, 308.4; 134/5, 22.11, 24, 42

[56] References Cited

U.S. PATENT DOCUMENTS

| | | | |
|---|---|---|---|
| 2,388,325 | 11/1945 | Houtz et al. | 264/185 |
| 3,960,152 | 6/1976 | Augurt et al. | 128/335.5 |
| 4,033,938 | 7/1977 | Augurt et al. | 260/78.3 R |
| 4,206,101 | 6/1980 | Wysong | 260/23 R |
| 4,534,349 | 8/1985 | Barrows | 128/334 R |
| 4,674,772 | 6/1987 | Lycan | 285/22 |
| 4,870,966 | 10/1989 | Dellon et al. | 128/334 R |
| 4,883,618 | 11/1989 | Barrows | 264/49 |
| 5,070,126 | 12/1991 | Toyonishi et al. | 524/224 |
| 5,225,120 | 7/1993 | Graiver et al. | 264/28 |
| 5,272,191 | 12/1993 | Ibrahim et al. | 524/35 |
| 5,389,724 | 2/1995 | LaFleur | 525/57 |

FOREIGN PATENT DOCUMENTS

| | | |
|---|---|---|
| A29663/92 | 6/1993 | Australia . |
| 0444230A1 | 9/1991 | European Pat. Off. . |

*Primary Examiner*—David A. Simmons
*Assistant Examiner*—Linda L. Gray
*Attorney, Agent, or Firm*—Michael T. Bates

[57] ABSTRACT

A process for preparing two connected powder transfer conduits for cleaning without releasing powder from the conduits. The conduits are connected to each other by flexible tube of a water-dissolvable material to enable powder communication between the two conduits. A sealing operation is performed to form a seal in the tube sufficient to prevent the powder communication from one side of the seal to the other. The seal is then severed to produce two tube sections where each tube section is sealed at the point of severance. A cleaning conduit is then place over at least one of the two tube sections and connected to the respective conduit. The cleaning conduit is connected to a liquid cleaning source which is adapted to deliver a cleaning liquid capable of dissolving the tube section thereunder upon contact therewith.

3 Claims, 3 Drawing Sheets

Traditional CIP with Flexible Connections

CIP Approach with Soluble Material

1.

2.

3.

4.

5.

PROCESS FOR ENVIRONMENTALLY SAFE CLEANING USING WATER-SOLUBLE POLYMER BASED PACKAGES

This application claims benefit of provisional application 60/003,348, filed Sept. 7, 1995.

The present invention relates generally to the containment of a toxic or hazardous substance during a cleaning process, and more particularly to the use of water-soluble polymers as sealed containers for enabling the cleaning of materials without toxic exposure to human operators. The present invention includes a number of different embodiments such as those detailed below. Other applications of the present invention are also possible.

The use of water soluble films as packaging materials is well known in the art. Such is proposed in U.S. Pat. Nos. 5,070,126; 5,272,191; and 5,389,724. The '191 patent (column 2, lines 61–68 through column 3, lines 1–29) discloses a variety of water soluble polymers. The present invention may incorporate any of these materials as suitable for the purposes of the present invention. Although polyvinyl alcohol-based films are disclosed in detail, other water soluble polymers may be used instead.

In one embodiment, the present invention relates to flexible tubing connections for powder transfer from one piece of process equipment to another. The flexible tubing is conventionally made of polyethylene or similar material. Currently, the internal components of process equipment are cleaned by clean-in-place (CIP) systems, which require removal of the flexible tube from the metal tubes of the equipment to allow the CIP piping to be attached to the metal tubes. This process is illustrated in FIGS. 1A–1D. Specifically, FIG. 1A shows a flexible tube or chute 10 between rigid tubes or pipes 12 and 14. Referring to FIG. 1B, end 16 of flexible tube 10 is removed from end 18 of rigid tube 14 to enable CIP piping to be attached to end 18. Upon removal of end 16 from end 18, residual powders migrate from the tube openings into breathing zones, which can create a hazard to the human operator. FIGS. 1C and 1D illustrate the attachment of CIP piping 20 to opening 18 of tube 14.

It is desired to provide a process by which CIP piping may be connected to the rigid tubes without allowing residual powders in the metal tubes or the flexible tubes to migrate into breathing zones upon separating the flexible tubing from the metal tubes. The present invention solves this problem by providing a flexible tubing made of a water soluble material that dissolves or melts in the presence of water. Materials that are suitable are water soluble polymer-based materials such as polyvinyl alcohol (PVA). However, as noted above other water soluble polymers are suitable for this application. In one embodiment, the flexible tubing is formed from a stock material sold under the trade name MONO-SOL, available from Chris-Craft Industrial Products, Inc. This particular material comprises about 79% PVA resin, about 20.5% plasticizers, and small amounts of magnesium stearate and sodium bisulfite. Of course other water soluble polymers having a different percentage of PVA could also be suitable.

Figure 1A:
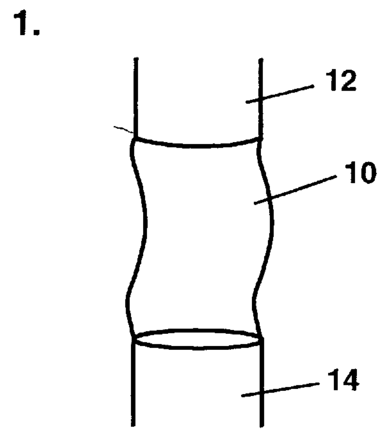
Figure 1A (prior art)
FIGS. 1A–1D illustrate a prior art clean-in-place process using flexible connections.
Figure 1B:
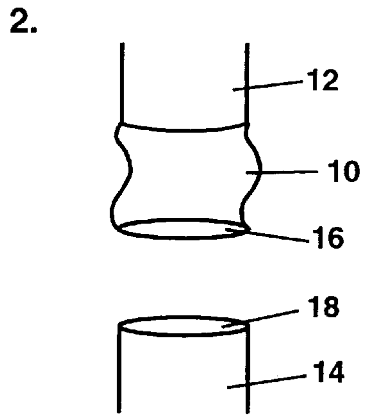
Figure 1B (prior art)
Figure 1C:
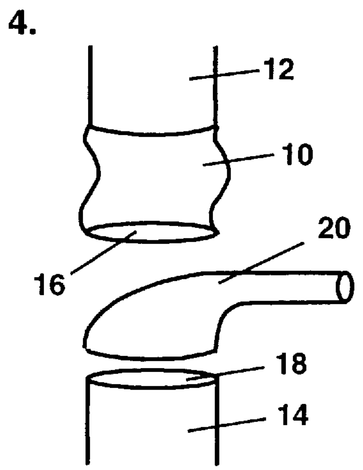
Figure 1C (prior art)
Figure 1D:
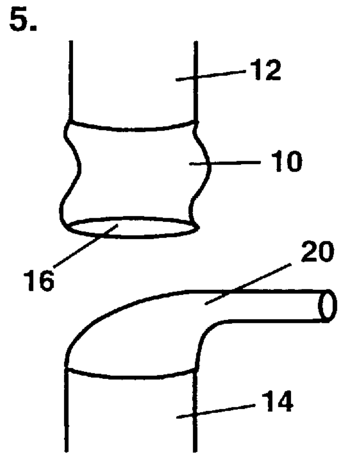
Figure 1D (prior art)
Figure 2A:
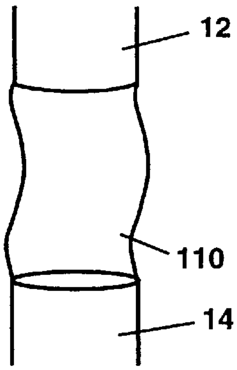
FIGS. 2A–2E illustrate a clean-in-place approach in accordance with the present invention using a soluble material.
Figure 2B:
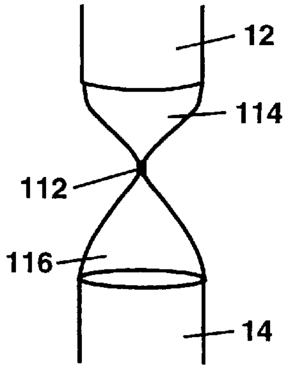
Figure 2C:
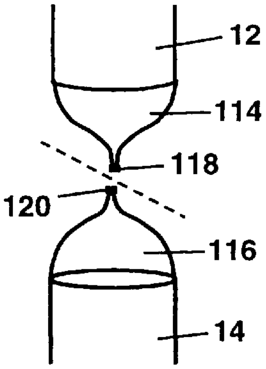
Figure 2D:
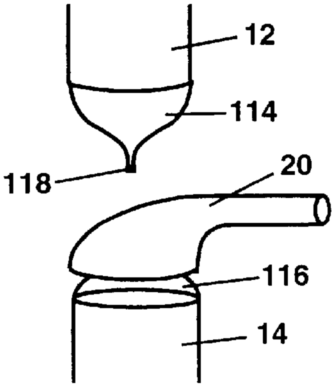
Figure 2E:
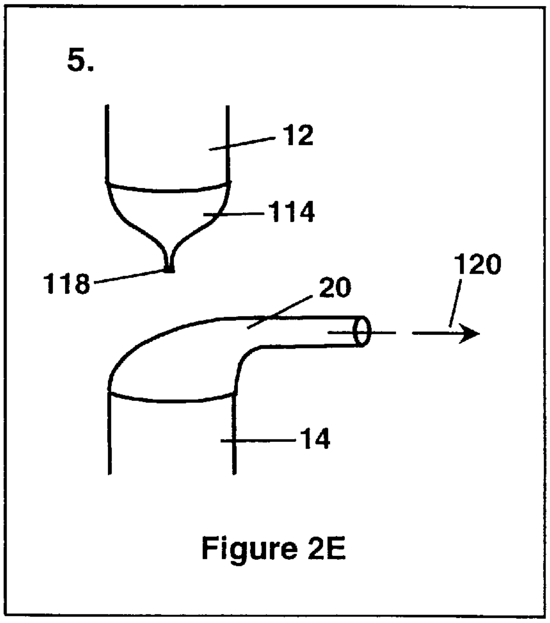

The novel process of powder containment during cleaning is illustrated in FIGS. 2A–2E. FIG. 2A shows the PVA-based flexible tubing 110 attached to rigid tubes 12 and 14. As shown in FIG. 2B, the first step in the process is to crimp tubing 110 at some point along its longitudinal axis and then seal the tubing at the crimp point. One desirable method of sealing involves tightly taping the tubing 110 at the crimp point with a water-dissolvable tape 112, such as Scotch brand No. 5414 water soluble tape, commercially available from 3M Corporation. An alternative method is to heat-seal a seam across the material. Heat sealing methods include direct thermal conduction or indirect methods, such as radio frequency welds, etc. The taping or sealing process forms two portions of tubing 110, an upper portion 114 and a lower portion 116. As a result of the sealing process, flow communication between portions 114 and 116 is prevented. After tubing 110 has been sealed, the tape or seal 112 is severed to form two sealed ends 118 and 120, as illustrated in FIG. 2C. Sealed ends 118 and 120 effectively prevent the migration of dust from tubing portions 114, 116 into the outside environment. The CIP tubing 20 is then placed over the desired flexible tubing portion (e.g. portion 116) and attached to rigid tubing 14, as shown in FIGS. 2D and 2E. The CIP process begins with a water rinse that dissolves flexible tubing portion 116, resulting in water flow into or out of CIP tubing 20, as indicated by arrow 130. The cleaning and rinse cycles can then be run.

In another embodiment of the present invention, a container made of a water-soluble based polymer is provided. In one embodiment, the container is made of the MONO-SOL stock material described above. The container, like the flexible tubing discussed above, is dissolvable in the presence of water. The container is adapted to hold metal parts contaminated or coated with toxic compounds or chemicals. After the contaminated parts are loaded into the PVA container, the entire container is placed in a parts washer. This eliminates the step of a human operator removing the contaminated parts from the container and placing the parts in a parts washer. Thus, this process prevents human exposure to the chemicals upon placing the contaminated parts in the parts washer. The PVA-based container then dissolves in the water-based cleaner to enable the parts to be cleaned by the solvent in the parts washer.

Figure 3:
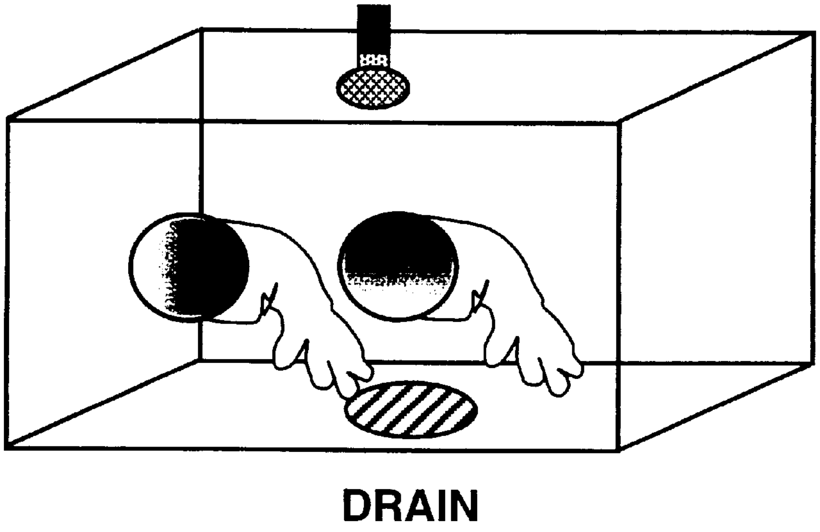
Figure 3 (prior art)
FIG. 3 illustrates a prior art glove bag.

In another embodiment, the present invention provides a glove box or glove bag comprising a sealed compartment having holes to which are attached gloves for use in handling dangerous materials inside the compartment. Conventional glove bags, such as that illustrated in FIG. 3, are made of either steel and rigid transparent material (e.g., glass, acrylic) or a non-soluble flexible material (e.g., polyethylene, polyurethane, etc.). Such bags include a connection for attaching a CIP nozzle for cleaning. After cleaning it is necessary to examine the inside surfaces of the glove bag to determine whether it has been sufficiently cleaned. This requires the implementation of procedures and time. It is desirable to obviate the need for post-cleaning procedures.

Figure 4:
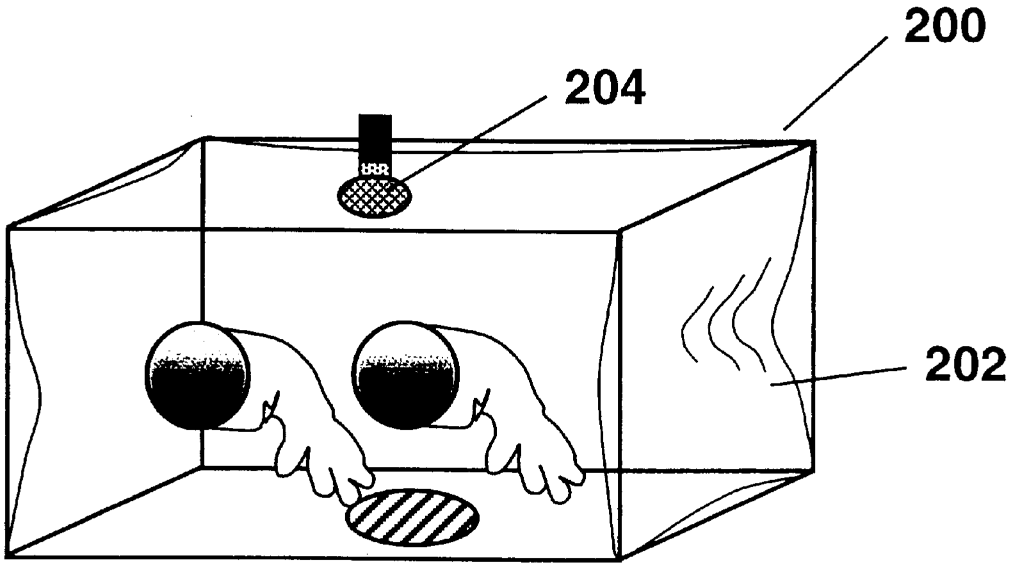
FIG. 4 illustrates a glove bag in accordance with the present invention.

Referring to FIG. 4, a glove box or glove bag in accordance with the present invention is shown. In this embodiment, frame 200 is made of stainless steel or another suitable rigid material. Glove bag 202 may be draped over frame 200 or affixed to the frame in any other suitable manner. Glove bag 202 is made from a water-soluble polymer such as the MONO-SOL product described above. As shown, glove bag 202 includes a connection 204 for a CIP nozzle (not shown) for cleaning purposes. The nozzle is placed over or inside the connection and activated, dissolving the glove bag around the CIP equipment and encapsulating the toxic powder to keep it from migrating up into the worker's breathing zone. Ultimately, the toxic powder is mixed with the water and dissolved glove bag solution and can be washed down the drain to a retainage tank for appropriate disposal. Thus, the glove bag of the present invention allows an alternate method of cleaning/decontamination of equipment in a contained fashion. The glove bag made in accordance with the present invention also reduces cleaning validation time.

I claim:

1. A process of preparing two connected powder transfer conduits for cleaning, without releasing powder from the conduits, the process comprising the steps of:

providing a first piece of equipment having a first conduit and a second piece of equipment having a second conduit;

providing a water-dissolvable flexible tube having a first end connected to the first conduit and a second end connected to the second conduit to enable powder communication between the first conduit and the second conduit;

sealing a section of the flexible tube to form a seal in the flexible tube sufficient to prevent the powder communication from one side of said seal to the other;

severing the seal to form a first tube section connected to the first conduit and a second tube section connected to the second conduit, each tube section being sealed at the point of severance; and positioning a cleaning conduit over the first tube section and attaching the cleaning conduit to the first conduit, the cleaning conduit being connected to a liquid cleaning source which is adapted to deliver a cleaning liquid capable of dissolving the first tube section upon contact therewith.

2. The process of claim 1, wherein the step of sealing includes taping the section of tubing.

3. The process of claim 1, wherein the step of sealing includes heat sealing a seam across the section of the flexible tube.

* * * * *

UNITED STATES PATENT AND TRADEMARK OFFICE
CERTIFICATE OF CORRECTION

PATENT NO. : 5,935,366
DATED : August 10, 1999
INVENTOR(S) : James P. Wood

It is certified that error appears in the above-identified patent and that said Letters Patent is hereby corrected as shown below:

Column 4, line 15, in Claim 2 reads ..."section of tubing."... should read --section of the tube.--

Signed and Sealed this

Ninth Day of May, 2000

Attest:

Q. TODD DICKINSON

*Attesting Officer* *Director of Patents and Trademarks*